US011873986B2

(12) United States Patent
Wang et al.

(10) Patent No.: US 11,873,986 B2
(45) Date of Patent: Jan. 16, 2024

(54) FAN LAMP WITH DIRECTIONAL LIGHT AND FLOODLIGHT AND RETRACTABLE BLADE ASSEMBLY

(71) Applicants: SUZHOU OPPLE LIGHTING CO., LTD., Suzhou (CN); OPPLE LIGHTING CO., LTD., Shanghai (CN)

(72) Inventors: Yaohai Wang, Suzhou (CN); Wangbosheng Wu, Suzhou (CN); Hui Han, Suzhou (CN); Xin Sun, Suzhou (CN)

(73) Assignees: SUZHOU OPPLE LIGHTING CO., LTD., Suzhou (CN); OPPLE LIGHTING CO., LTD., Shanghai (CN)

( * ) Notice: Subject to any disclaimer, the term of this patent is extended or adjusted under 35 U.S.C. 154(b) by 0 days.

(21) Appl. No.: 18/080,936

(22) Filed: Dec. 14, 2022

(65) Prior Publication Data

US 2023/0117222 A1 Apr. 20, 2023

Related U.S. Application Data

(63) Continuation of application No. PCT/CN2021/102823, filed on Jun. 28, 2021.

(30) Foreign Application Priority Data

Jun. 30, 2020 (CN) ......................... 202010625120.6
Jun. 30, 2020 (CN) ......................... 202021263661.0

(51) Int. Cl.
*F21V 33/00* (2006.01)
*F04D 19/00* (2006.01)
(Continued)

(52) U.S. Cl.
CPC ........ *F21V 33/0096* (2013.01); *F04D 19/002* (2013.01); *F04D 25/06* (2013.01);
(Continued)

(58) Field of Classification Search
CPC ............. F21V 33/0096; F21Y 2113/00; F21Y 2113/10; F21Y 2113/13; F21Y 2113/17; F21Y 2113/20; F21Y 2113/30
See application file for complete search history.

(56) References Cited

U.S. PATENT DOCUMENTS 10,125,971 B2 * 11/2018 Graziano ............ F21V 33/0096
11,280,350 B2 * 3/2022 Li .......................... F04D 25/088
(Continued)

FOREIGN PATENT DOCUMENTS

CN 201302101 Y 9/2009
CN 202902094 U 4/2013
(Continued)

OTHER PUBLICATIONS

International Search Report of PCT Application No. PCT/CN2021/102823 dated Sep. 8, 2021 with English translation, (4p).

*Primary Examiner* — Robert J May
(74) *Attorney, Agent, or Firm* — Arch & Lake LLP

(57) ABSTRACT

The present disclosure discloses a fan lamp, relates to the technical field of lighting lamp. The fan lamp includes a ceiling suction assembly, a hanger rod, a blade assembly, a light source assembly, and a driver, the ceiling suction assembly is connected with the blade assembly through the hanger rod, the light source assembly is connected with the blade assembly, and the light source assembly is located on a side of the blade assembly facing away from the ceiling suction assembly, the driver is mounted in the ceiling suction assembly or the light source assembly, and the driver is electrically connected with at least one of the blade assem-
(Continued)

bly and the light source assembly, the light source assembly includes a chassis and a directional lighting module, and the directional lighting module is mounted on the chassis.

14 Claims, 10 Drawing Sheets

(51) Int. Cl.
*F04D 25/06* (2006.01)
*F04D 29/00* (2006.01)
*F21S 8/06* (2006.01)
*F21V 5/04* (2006.01)

(52) U.S. Cl.
CPC ............ *F04D 29/002* (2013.01); *F21S 8/063* (2013.01); *F21V 5/04* (2013.01)

(56) References Cited

U.S. PATENT DOCUMENTS

| | | | | |
|---|---|---|---|---|
| 2015/0276207 | A1* | 10/2015 | Liu | F21V 33/0096 416/5 |
| 2019/0301706 | A1 | 10/2019 | Zhou et al. | |

FOREIGN PATENT DOCUMENTS

| | | | | |
|---|---|---|---|---|
| CN | 105805647 | A | * | 7/2016 |
| CN | 109026835 | A | * | 12/2018 |
| CN | 109026835 | A | | 12/2018 |
| CN | 109114038 | A | | 1/2019 |
| CN | 208457591 | U | | 2/2019 |
| CN | 210637862 | U | | 5/2020 |
| CN | 111623285 | A | | 9/2020 |
| CN | 111623286 | A | | 9/2020 |
| CN | 111997925 | A | | 11/2020 |
| CN | 111997926 | A | | 11/2020 |

* cited by examiner

FAN LAMP WITH DIRECTIONAL LIGHT AND FLOODLIGHT AND RETRACTABLE BLADE ASSEMBLY

CROSS-REFERENCE TO RELATED APPLICATIONS

This application is based upon and claims the priority of PCT patent application No. PCT/CN2021/102823 filed on Jun. 28, 2021 which claims priority to the Chinese patent application No. 202010625120.6 filed on Jun. 30, 2020, and the Chinese patent application No. 202021263661.0 filed on Jun. 30, 2020, the entire contents of which are hereby incorporated by reference herein for all purposes.

TECHNICAL FIELD

The present disclosure relates to the technical field of lighting lamp, and in particular to a fan lamp.

BACKGROUND

Fan lamp is a household appliance, which is a combination of a fan and a lamp. The fan and the lamp of the fan lamp can be controlled by switches, respectively, so that the fan lamp has both an effect of lighting and the effect of fan blowing.

SUMMARY

The present disclosure discloses a fan lamp.

The present disclosure discloses a fan lamp which may include a ceiling suction assembly, a hanger rod, a blade assembly, a light source assembly, and a driver.

The ceiling suction assembly may be connected with the blade assembly through the hanger rod, the light source assembly may be connected with the blade assembly, and the light source assembly may be located on a side of the blade assembly facing away from the ceiling suction assembly, the driver may be mounted in the ceiling suction assembly or the light source assembly, and the driver may be electrically connected with at least one of the blade assembly and the light source assembly.

The light source assembly may also include a chassis and a directional lighting module, and the directional lighting module may be mounted on the chassis.

It is to be understood that both the foregoing general description and the following detailed description are exemplary and explanatory only and are not restrictive of the present disclosure.

BRIEF DESCRIPTION OF THE DRAWINGS

In order to more clearly illustrate the technical solution of the examples or background of the present disclosure, the drawings that are used in the examples or background will be briefly described in the following. For those of ordinary skill in the art, other drawings can also be obtained from these drawings without any inventive work.

DETAILED DESCRIPTION

Figure 1:
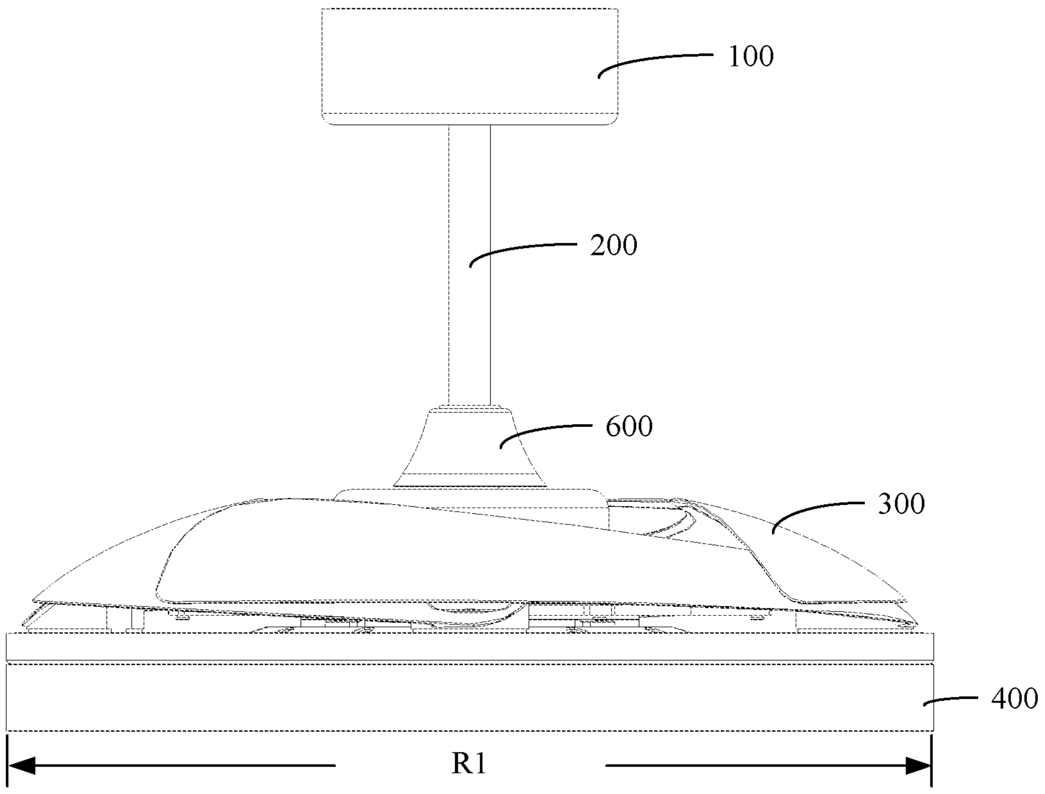
FIG. 1 is a schematic structural diagram of a fan lamp disclosed in an example of the present disclosure.
Figure 2:
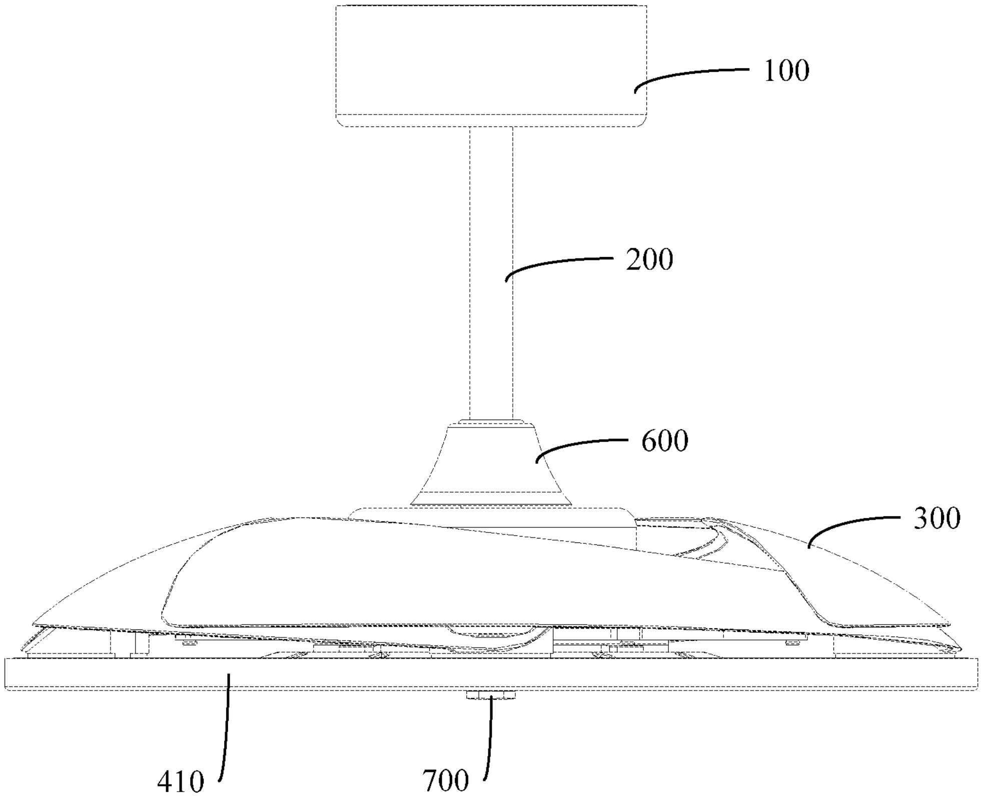
FIG. 2 is a schematic diagram of a partial structure of a fan lamp disclosed in an example of the present disclosure.
Figure 3:
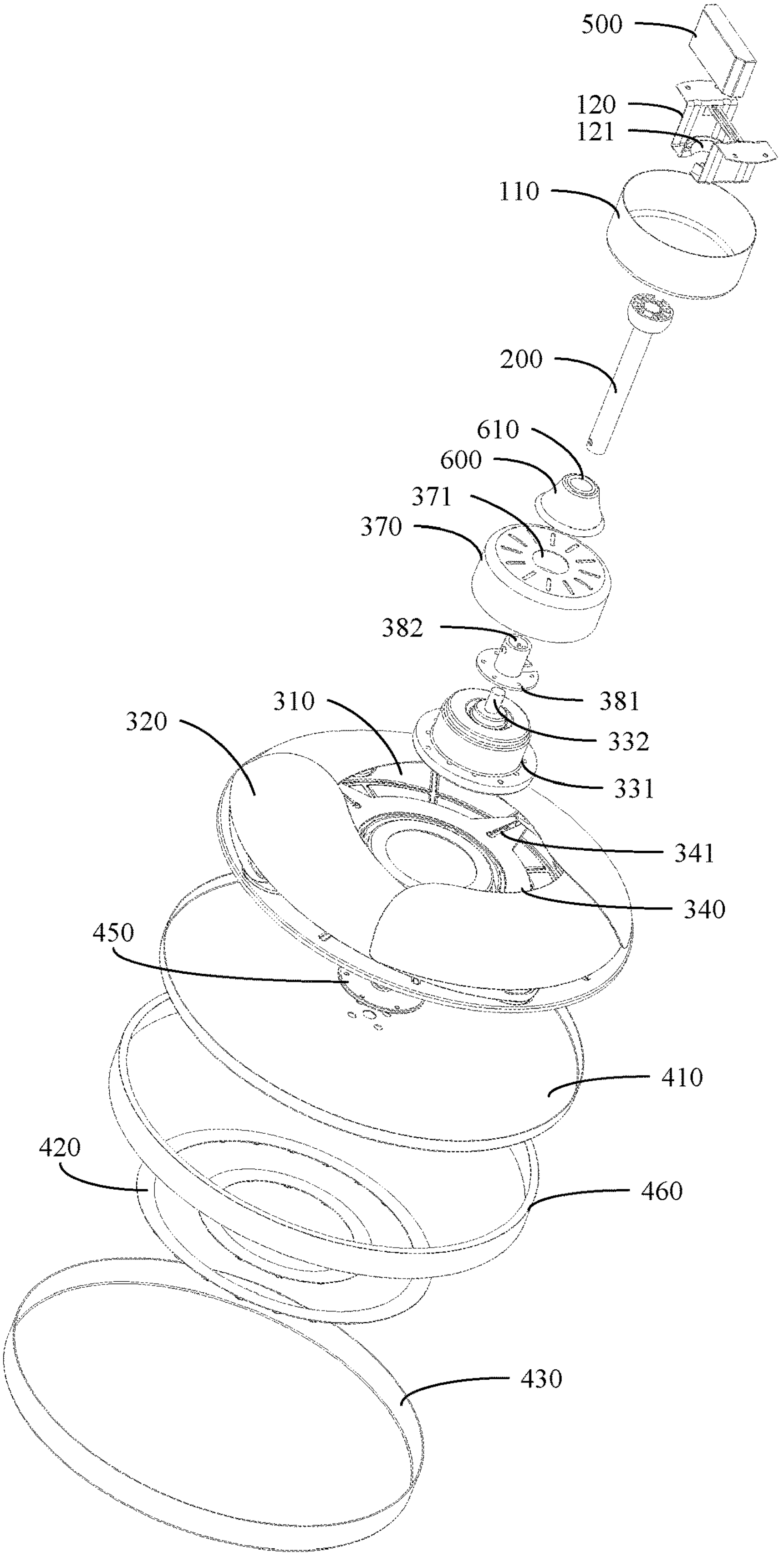
FIG. 3 is an exploded diagram of a fan lamp disclosed in an example of the present disclosure.
Figure 4:
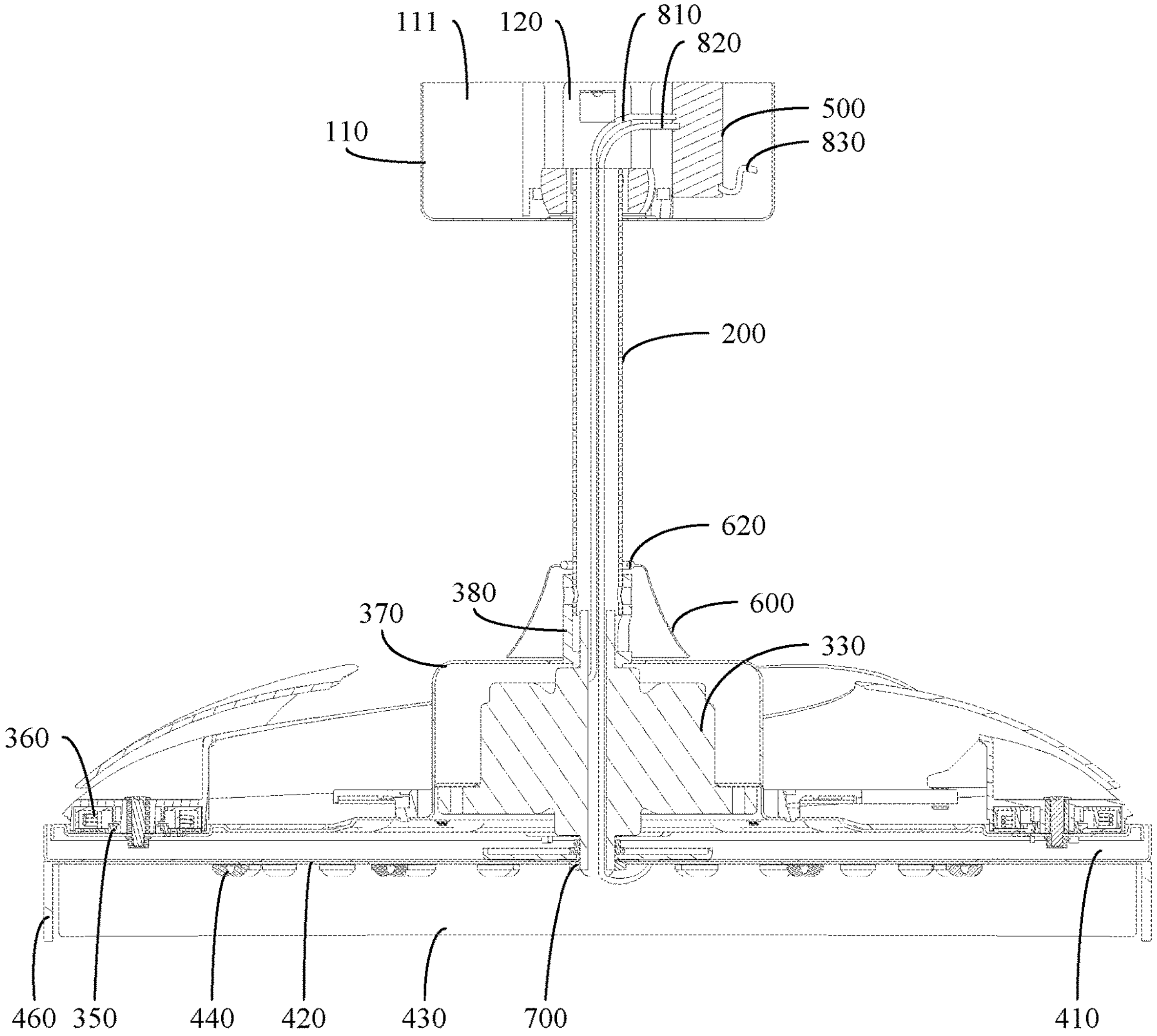
FIG. 4 is a cross-sectional view of a fan lamp disclosed in an example of the present disclosure.
Figure 5:
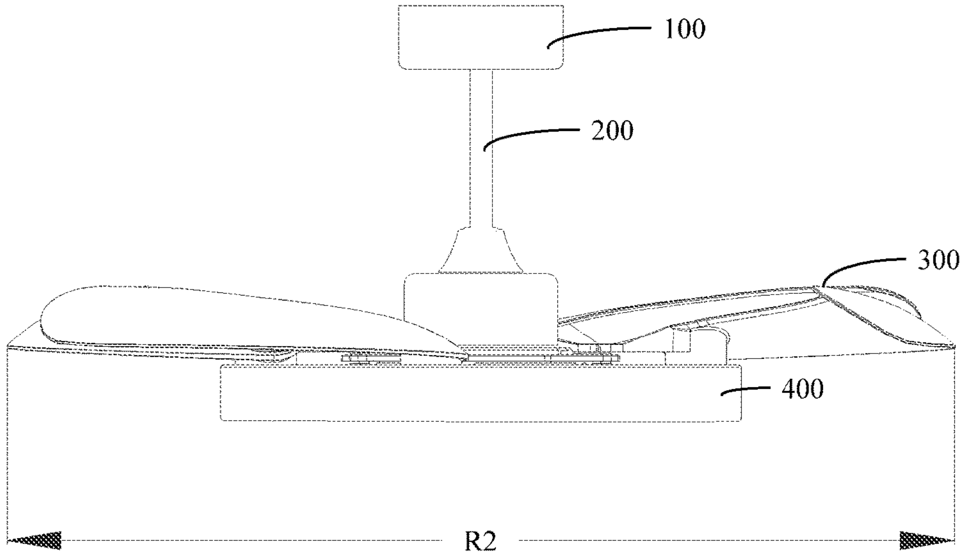
FIG. 5 is a schematic structural diagram of a fan lamp disclosed in an example of the present disclosure in the case where retractable blades are expanded.
Figure 6:
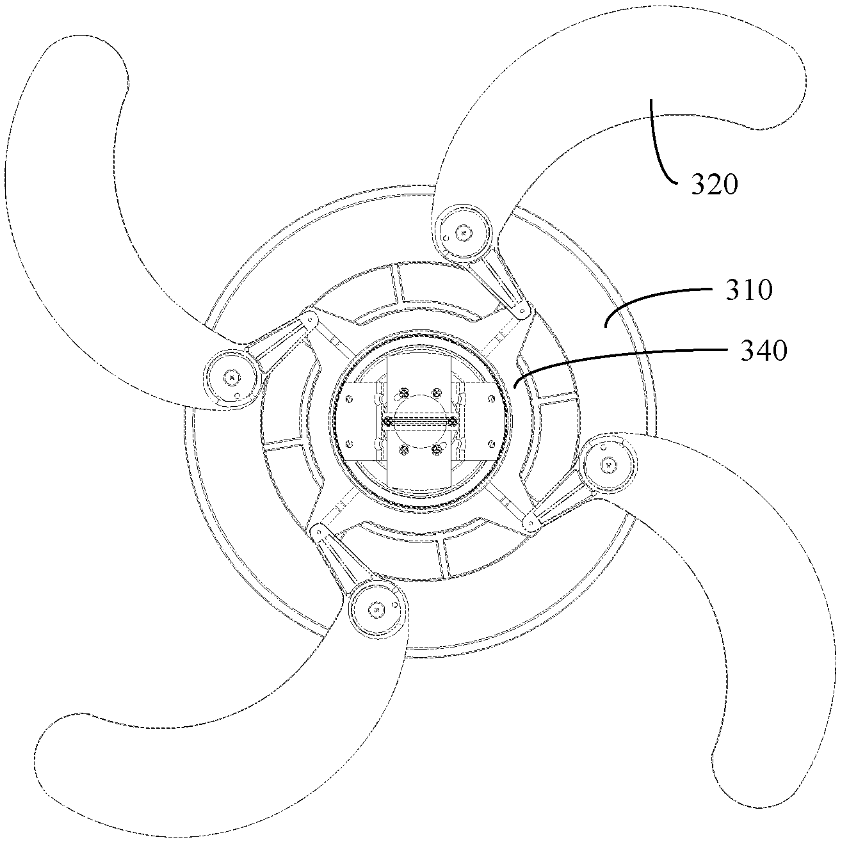
FIG. 6 is a top view of FIG. 5.

In order to make objectives, technical solutions and advantages of the present disclosure more clear, the technical solutions of the present disclosure will be described in a clearly and fully understandable way in connection with the drawings related to the examples of the present disclosure. Apparently, the described examples are just a part but not all of the examples of the present disclosure. Based on the described examples herein, those skilled in the art can obtain other example(s), without any inventive work, which should be within the protection scope of the present disclosure.

Reference numeral used in this disclosure may include:

100—ceiling suction assembly, 110—ceiling suction box, 111—mounting chamber, 120—hanger bracket, 121—connection portion; 200—hanger rod; 300—blade assembly, 310—base plate, 320—retractable blade, 330—drive motor, 331—casing, 331*a*—upper cover, 331*b*—lower cover, 332—stator module, 333—rotor module, 334—first bearing, 335—second bearing, 340—synchronizing element, 341—sliding groove, 350—mounting seat, 360—torsion spring, 370—motor cover, 371—third through hole, 380—connection piece, 381—positioning board, 382—cylindrical body; 400—light source assembly, 410—chassis, 420—light source board, 430—light-transmitting cover, 440—light-emitting module, 450—mounting plate, 460—decorative ring, 470—directional lighting module, 471—first light source board, 472—first light-emitting module, 472*a*—first light-emitting unit, 472*b*—first light distribution element, 473—anti-glare mask, 480—floodlighting module, 481—second light source board, 482—second light-emitting module, 483—light diffusing mask, 490—face frame, 491—first receiving hole, 492—second receiving hole, 500—driver, 600—covering mask, 610—fourth through hole, 620—elastic ring, 700—positioning piece; 810—first electrical connecting member, 820—second electrical connecting member, 830—mains electricity connecting member.

Sometimes, a commercially available fan lamp is improved from a traditional fan. On a basis of the fan, a lighting lamp may be stacked. Light emitted from the lighting lamp may have a large light emergent angle, so a final effect is a wide range of lighting effect. This lighting effect cannot meet users' requirement for lighting accent regions, and the lighting effect of this fan lamp is not good.

The technical solution disclosed in various examples of the present disclosure will be described in detail below with reference to accompanying drawings.

Referring to FIG. 1 to FIG. 11, an example of the present disclosure discloses a fan lamp, which includes a ceiling suction assembly 100, a hanger rod 200, a blade assembly 300, a light source assembly 400, and a driver 500. The ceiling suction assembly 100 is used to realize a connection between the fan lamp and a mounting base (for example, a roof), so as to realize mounting of the fan lamp. The hanger rod 200 can realize the connection between the blade assembly 300 and the ceiling suction assembly 100, that is to say, a length of the hanger rod 200 can be flexibly set. Optionally, the hanger rod 200 can adopt a multi-section structure, so that users can adjust the length of the hanger rod 200 according to their own needs, thereby changing a mounting height of the fan lamp. The blade assembly 300 can realize a blowing function, and the light source assembly 400 can perform lighting, which makes the fan lamp more functional. The driver 500 can supply power to the blade assembly 300 and the light source assembly 400, thereby ensuring a reliable operation of the blade assembly 300 and the light source assembly 400.

The blade assembly 300 includes a base plate 310, a retractable blade 320, and a drive motor 330. The retractable blade 320 is rotatably mounted on the base plate 310, and the drive motor 330 is connected with the base plate 310, so that the drive motor 330 can drive the base plate 310 to rotate, and the retractable blade 320 rotates with respect to the base plate 310 under an action of centrifugal force, so as to realize an expansion and a retraction of the retractable blade 320. In an optional example, in the case where the retractable blade 320 is retracted, a diameter R1 of the fan lamp may be 420-480 mm; in the case where the retractable blade 320 is expanded, a diameter R2 of the fan lamp may be 900-1200 mm. Optionally, a number of retractable blades 320 may be at least two, the retractable blades 320 may be disposed along a circumferential direction of the base plate 310, and the retractable blades 320 may be expanded or retracted synchronously. With the number of retractable blades 320 increases, a heat dissipation effect of the fan lamp is better.

The ceiling suction assembly 100 is connected with the blade assembly 300 through the hanger rod 200. Specifically, one end of the hanger rod 200 is connected with the ceiling suction assembly 100, and the other end of the hanger rod 200 is connected with a first end of the drive motor 330. The light source assembly 400 is connected with the blade assembly 300. Specifically, the light source assembly 400 is connected with a second end of the drive motor 330, and the light source assembly 400 is located on the side of the blade assembly 300 facing away from the ceiling suction assembly 100. In this solution, the blade assembly 300 and the light source assembly 400 are connected by the drive motor 330, and no additional connection structure is required to connect the blade assembly 300 and the light source assembly 400 together, so the number of components included in the fan lamp is less, the entire fan lamp is more compact, and a space occupied by the fan lamp is smaller.

The driver 500 is mounted in the ceiling suction assembly 100, the blade assembly 300, or the light source assembly 400, that is, the driver 500 can be mounted by using a structure of the ceiling suction assembly 100, the blade assembly 300, or the light source assembly 400, therefore, an additional space occupied by the driver 500 is smaller, or even no additional space is occupied, thereby making the structure of the fan lamp more compact. In an optional example, the driver 500 is electrically connected with at least one of the blade assembly 300 and the light source assembly 400, so as to realize a driving of at least one of the blade assembly 300 and the light source assembly 400. The driver 500 can drive the light source assembly 400 to emit light in the case where the driver 500 is electrically connected with the light source assembly 400, thereby realizing a lighting function of the fan lamp. The driver 500 can drive the retractable blade 320 to expand and can drive the entire blade assembly 300 to rotate in the case where the driver 500 is electrically connected with the blade assembly 300, thereby realizing a blowing function of the fan lamp. The driver 500 can drive the blade assembly 300 to rotate and drive the light source assembly 400 to emit light at the same time in the case where the driver 500 is electrically connected with both of the blade assembly 300 and the light source assembly 400, thereby simultaneously realizing the blowing function and the lighting function of the fan lamp.

Further, the driver 500 may be configured to be electrically connected with the drive motor 330 and the light source assembly 400 at the same time. Optionally, the driver 500 is electrically connected with the drive motor 330 through a first electrical connecting member 810, and the driver 500 is electrically connected with the light source assembly 400 through a second electrical connecting member 820. In addition, the driver 500 can be connected with mains electricity through a mains electricity connecting member 830, the first electrical connecting member 810, the second electrical connecting member 820, and the mains electricity connecting member 830 here can all adopt conductive wires. In this case, the driver 500 can be disposed in an integral manner, and the same driver 500 can supply power to the drive motor 330 and the light source assembly 400 at the same time, and a required number of the drivers 500 is naturally reduced. Optionally, the driver 500 can be disposed as one, and in the case where a power consumption of the fan lamp is relatively large, two or even more drivers 500 can further be disposed, and each driver 500 is configured to be electrically connected with the drive motor 330 and the light source assembly 400 at the same time.

In the fan lamp disclosed in the example of the present disclosure, the drive motor 330 of the blade assembly 300 and the light source assembly 400 may be electrically connected with the same driver 500, so that the blade assembly 300 and the light source assembly 400 may be driven by the same driver 500. Compared with a manner in which the blade assembly 300 and the light source assembly 400 are driven by their respective drivers, the number of components of the fan lamp disclosed in the example of the present disclosure is reduced, and the space occupied by the fan lamp is smaller, thereby facilitating a transportation of the fan lamp.

In an optional example, the ceiling suction assembly 100 includes a ceiling suction box 100, the ceiling suction box 100 has a mounting chamber 111, and the driver 500 is mounted in the mounting chamber 111. In this case, the driver 500 is mounted by using the mounting chamber 111 of the ceiling suction box 100, and the driver 500 basically does not occupy any additional space, thereby making the structure of the fan lamp more compact.

Further, the ceiling suction assembly 100 further includes a hanger bracket 120 mounted in the mounting chamber 111. The hanger bracket 120 is mounted in the mounting chamber 111, the ceiling suction box 100 is fixedly connected with the hanger bracket 120, and the ceiling suction box 100 can be mounted on the mounting base by the hanger bracket 120. The hanger bracket 120 can adopt a U-shape structure, the hanger bracket 120 is provided with a connection portion

121, the connection portion 121 has a connection hole and a first spherical surface, the hanger rod 200 includes a second spherical surface, one end of the hanger rod 200 passes through the connection hole, and the first spherical surface is in contact with the second spherical surface, and through the cooperation of the first spherical surface and the second spherical surface, a position of the hanger rod 200 relative to the hanger bracket 120 can be changed, thereby facilitating the mounting of the fan lamp.

The driver 500 is mounted between a side surface of the hanger bracket 120 and an inner wall of the ceiling suction box 100. That is to say, an interval is provided between the side surface of the hanger bracket 120 and the inner wall of the ceiling suction box 100, and the driver 500 can be disposed by using the interval, therefore the driver 500 can be mounted by making full use of the mounting chamber in the ceiling suction box 100, so that the structure of the fan lamp is more compact.

Figure 7:
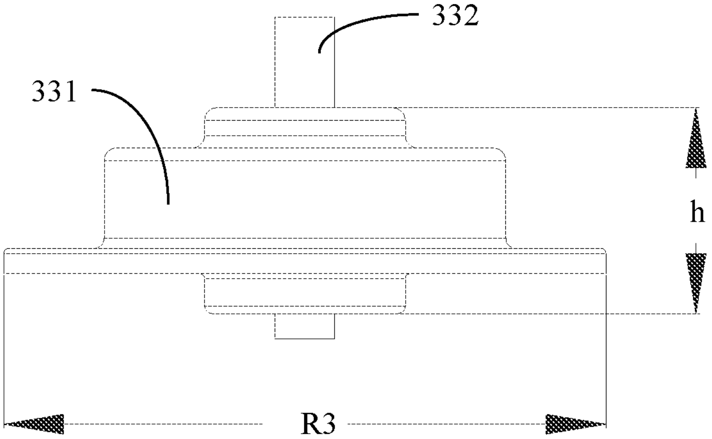
FIG. 7 is a schematic structural diagram of a drive motor disclosed in an example of the present disclosure.
Figure 8:
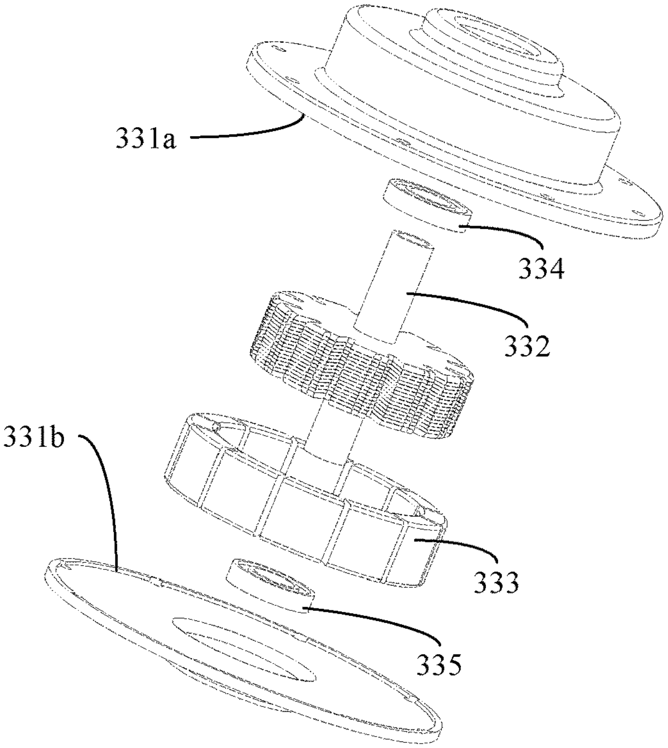
FIG. 8 is an exploded diagram of a drive motor disclosed in an example of the present disclosure.
Figure 9:
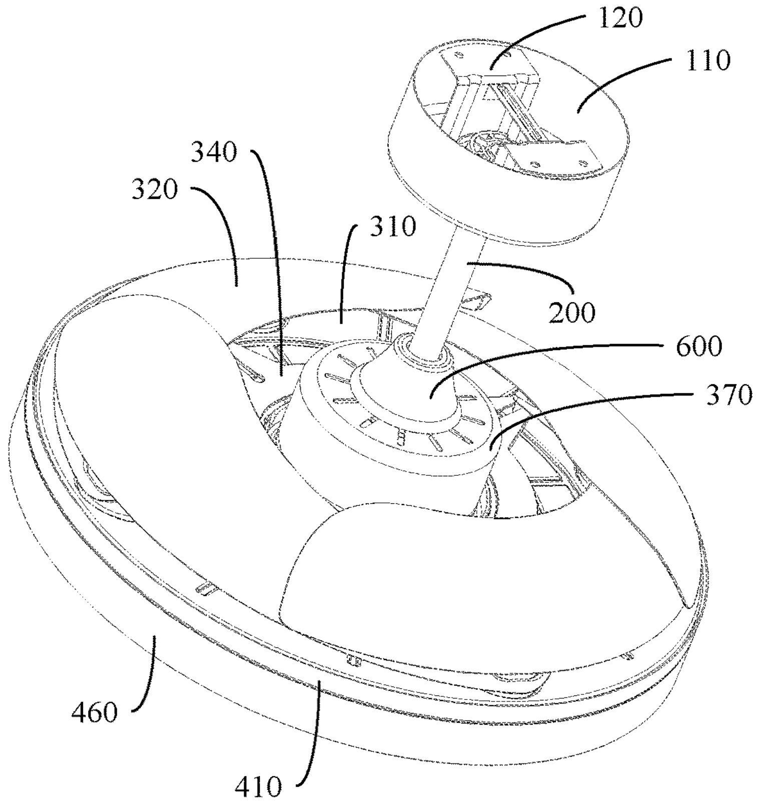
FIG. 9 is a schematic structural diagram of a fan lamp disclosed in another example of the present disclosure.
Figure 10:
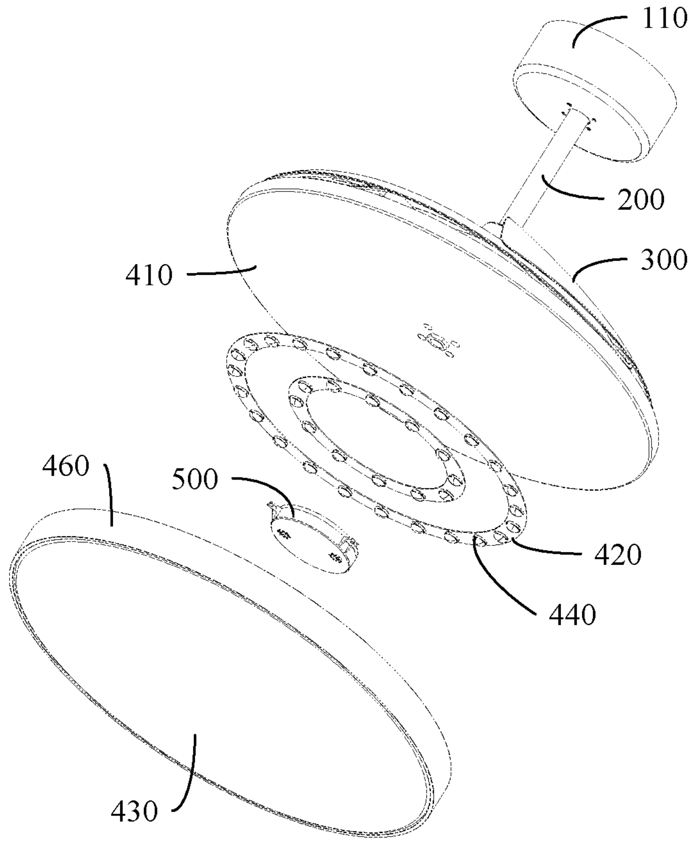
FIG. 10 is an exploded diagram of the fan lamp shown in FIG. 9.
Figure 11:
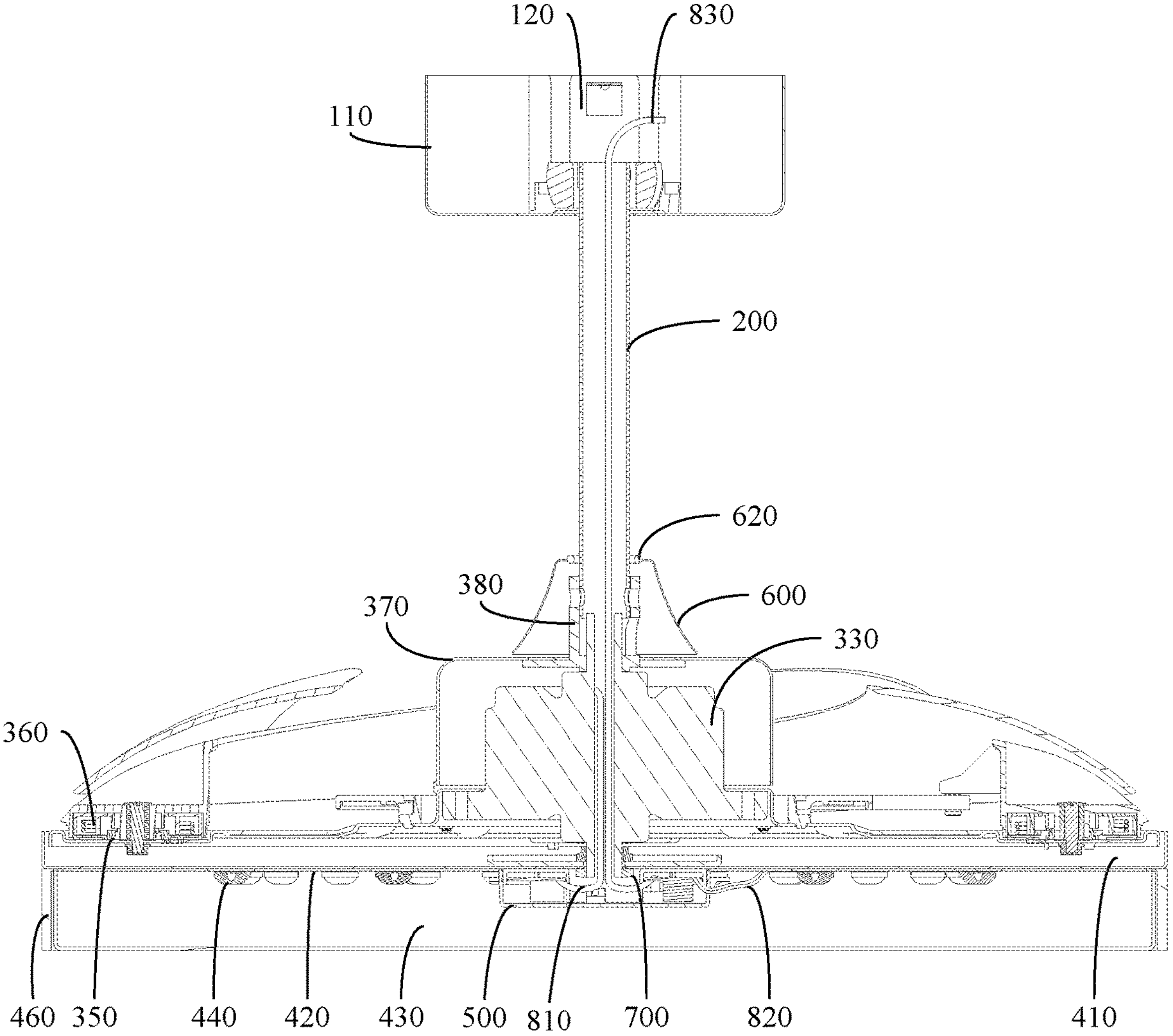
FIG. 11 is a cross-sectional view of the fan lamp shown in FIG. 9.
Figure 12:
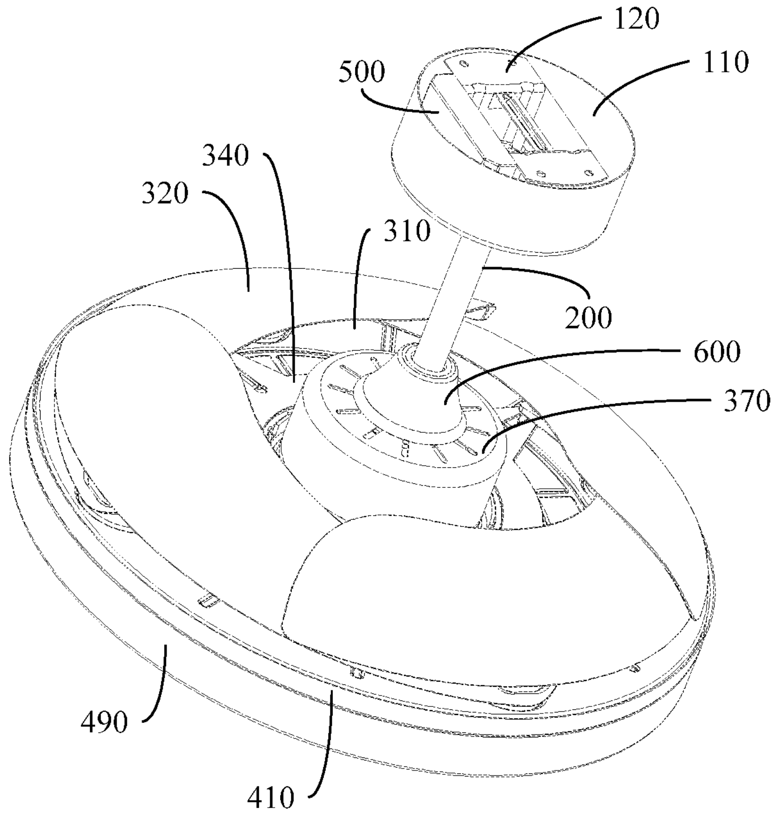
FIG. 12 is a schematic structural diagram of the fan lamp disclosed in another example of the present disclosure.
Figure 13:
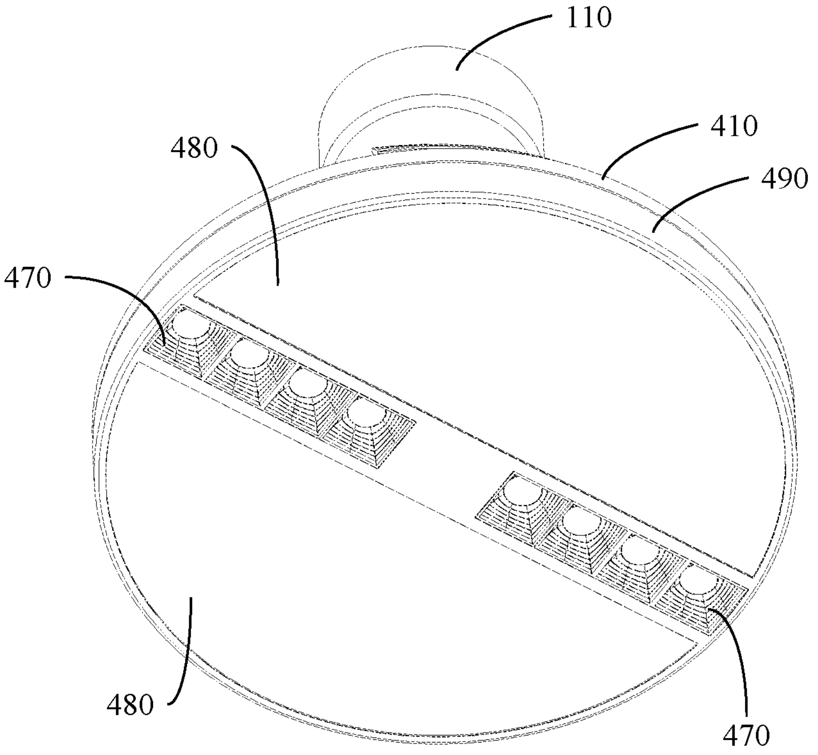
FIG. 13 is a schematic structural diagram of the fan lamp shown in FIG. 12 in another viewing angle.
Figure 14:
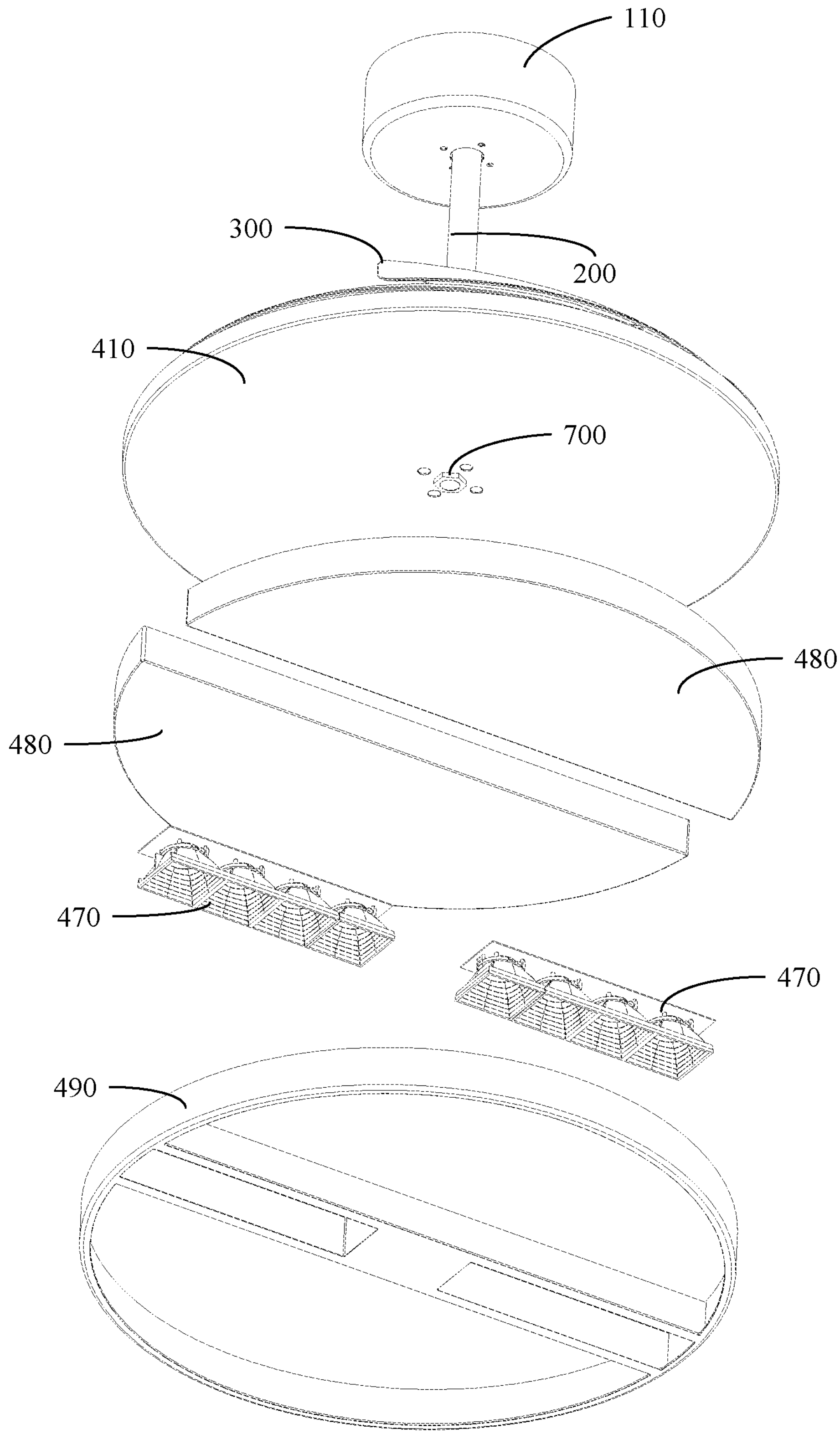
FIG. 14 is an exploded diagram of the fan lamp shown in FIG. 12.
Figure 15:
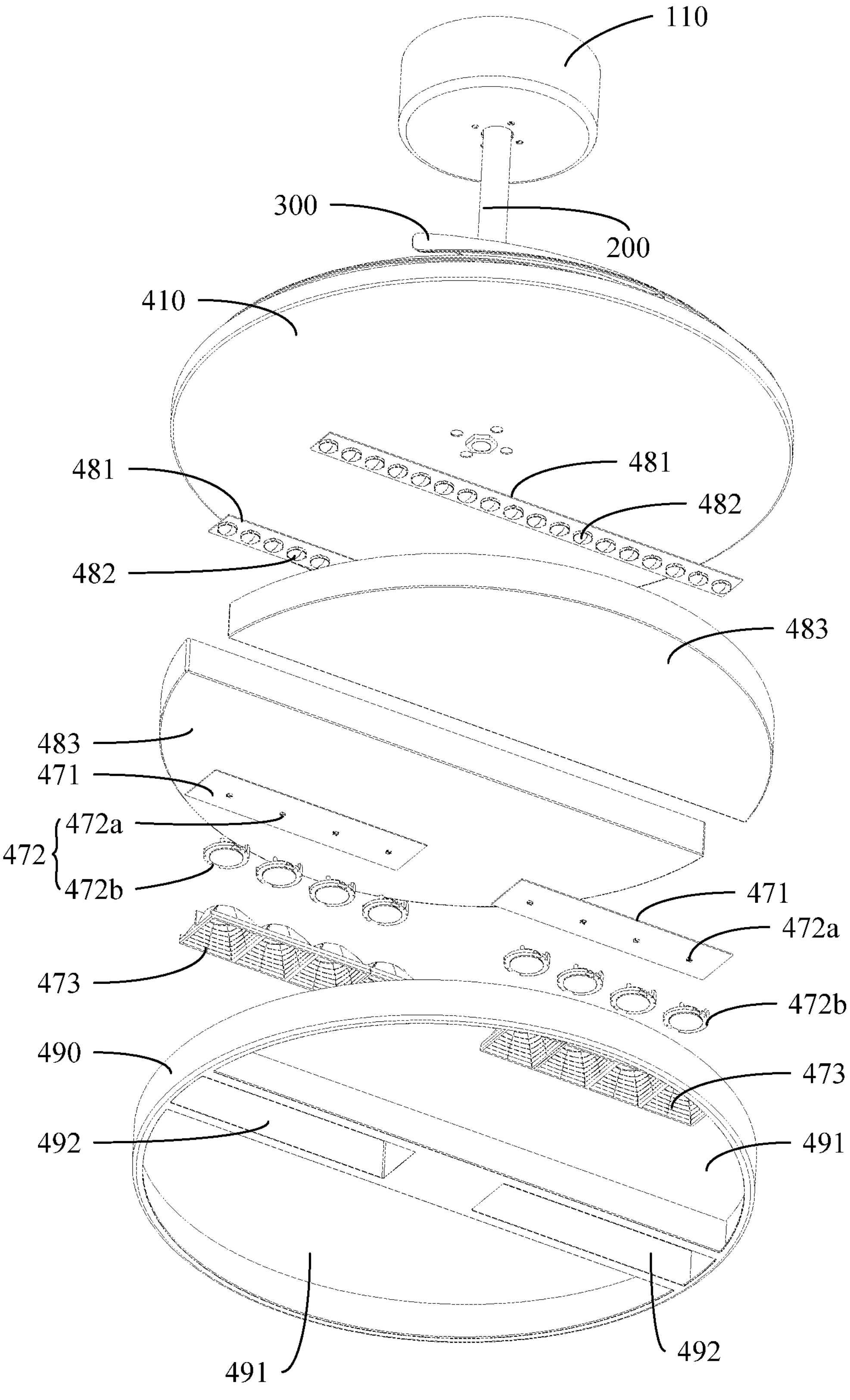
FIG. 15 is another exploded diagram of the fan lamp shown in FIG. 12.

Optionally, the drive motor 330 may include a casing 331, a stator module 332, a rotor module 333, a first bearing 334, and a second bearing 335, and the casing 331 may include an upper cover 331*a* and a lower cover 331*b*, the upper cover 331*a* and the lower cover 331*b* are detachably connected, and upon the upper cover 331*a* and the lower cover 331*b* being connected, a space for receiving the stator module 332 and the rotor module 333 is formed. The stator module 332 is fitted with the upper cover 331*a* through the first bearing 334, and is fitted with the lower cover 331*b* through the second bearing 335. Optionally, as shown in FIG. 7, an outer diameter R3 of the drive motor 330 may be 110-130 mm, preferably around 120 mm, and a height h of the drive motor 330 may be 40-50 mm, preferably around 45 mm, and the structure of the drive motor 330 is more compact, and the space occupied by the drive motor 330 is smaller.

Both ends of the stator module 332 are connected with the hanger rod 200 and the light source assembly 400, respectively, the rotor module 333 is connected with the casing 331, and the casing 331 is connected with the base plate 310. In the case where the drive motor 330 is powered on, a force is generated between the stator module 332 and the rotor module 333, so that the stator module 332 is fixed, and the rotor module 333 can rotate with respect to the stator module 332, so as to drive the casing 331 to rotate, and the casing 331 then drives the base plate 310 to rotate, thereby realizing the expansion of the retractable blade 320. In this solution, the base plate 310 is driven to rotate by the casing 331, the casing 331 is more stable when rotating, and the casing 331 has a stronger ability to bear the force. Therefore, the drive motor 330 has a higher transmission efficiency and a longer service life.

The stator module 332 is provided with a first through hole, the hanger rod 200 is provided with a second through hole, the first electrical connecting member 810 passes through the second through hole, and is electrically connected with the stator module 332 and the rotor module 333; the second electrical connecting member 820 passes through the second through hole and the first through hole in sequence, and is electrically connected with the light source assembly 400. After the first through hole and the second through hole are provided, the stator module 332 and the hanger rod 200 can avoid the first electrical connecting member 810 and the second electrical connecting member 820, so as to facilitate the electrical connection of the driver 500 with the drive motor 330 and the light source assembly 400. In this case, the first through hole and the second through hole can properly limit the positions of the first electrical connecting member 810 and the second electrical connecting member 820, so that the first electrical connecting member 810 and the second electrical connecting member 820 are not easy to interfere with other components, and the fan lamp operates more reliably.

In order to protect the drive motor 330, the blade assembly 300 may further include a motor cover 370, the motor cover 370 is disposed outside the casing 331, and the motor cover 370 may cover the drive motor 330 so as to protect the drive motor 330. Further, the blade assembly 300 may further include a connection piece 380, the connection piece 380 is connected with the motor cover 370, one end of the connection piece 380 is inserted into the hanger rod 200, and one end of the stator module 332 extends into the connection piece 380. In this example, the hanger rod 200 and the stator module 332 are connected together through the connection piece 380. Because the connection piece 380 and the hanger rod 200 are connected in an inserted manner, this manner is more convenient to operate, and the connection piece 380 and the hanger rod 200 are detachable, thereby facilitating a maintenance of the fan lamp.

The above-mentioned connection piece 380 and the motor cover 370 can adopt an integral structure, in order to facilitate the mounting and the maintenance of the fan lamp, the motor cover 370 may be provided with a third through hole 371, and the connection piece 380 includes a positioning board 381 and a cylindrical body 382, the positioning board 381 can be positioned and fitted with the motor cover 370, one end of the cylindrical body 382 is connected with the positioning board 381, and the other end of the cylindrical body 382 passes through the third through hole 371 and is connected with the hanger rod 200 in an inserted manner. Such structure can not only ensure a reliable connection between the connection piece 380 and the motor cover 370, but also make them detachable, thereby facilitating the mounting and the maintenance of the fan lamp.

In order to improve a connection strength between the hanger rod 200 and the connection piece 380, one end of the hanger rod 200 is threadedly connected with the cylindrical body 382, and the cylindrical body 382 is provided with a first insertion hole, the hanger rod 200 is provided with a second insertion hole, the first insertion hole and the second insertion hole are inserted with a plug. After adopting this connection manner, at least one of the hanger rod 200 and the connection piece 380 can be rotated so that the hanger rod 200 and the connection piece 380 are screwed together, and gradually inserted and connected. In this connection manner, the hanger rod 200 and the connection piece 380 are connected together more reliably by inserting and screwing. At the same time, when the hanger rod 200 and the connection piece 380 are rotated to a predetermined position, the first insertion hole and the second insertion hole are aligned, the plug is inserted into the first insertion hole and the second insertion hole, the plug can assist in limiting a relative rotation between the hanger rod 200 and the connection piece 380. Even if the blade assembly 300 of the fan lamp rotates, it is not easy for the hanger rod 200 and the connection piece 380 to be loosened due to their relative rotation, so that the structural strength of the fan lamp is higher.

The above-mentioned connection piece 380 may be in a bare state, and the plug is also in a bare state at this time, which is not only unsightly, but also has a risk that the plug is easily disassembled by mistake. Therefore, in order to solve this problem, the fan lamp further includes a covering mask 600, the covering mask 600 is disposed on the outside of the plug, the covering mask 600 can isolate the plug and the connection piece 380 from an external environment, thereby improving an aesthetics of the fan lamp. Meanwhile, when the users need to disassemble the hanger rod 200 and the connection piece 380, the covering mask 600 must be removed first, thereby reducing the risk of the plug being disassembled by mistake. Optionally, in order to simplify a disassembly operation and an assembly operation of the covering mask 600, the covering mask 600 can be sleeved on the outside of the hanger rod 200, which can move flexibly relative to the hanger rod 200, and can cover structures such as plugs under an action of its own gravity.

In a further example, the covering mask 600 is provided with a fourth through hole 610, and an elastic ring 620 is disposed at the fourth through hole 610, and the elastic ring 620 surrounds the hanger rod 200. The elastic ring 620 here can fill a gap between the hanger rod 200 and the fourth through hole 610, and the elastic ring 620 can be deformed after being stressed. The elastic ring 620 can reduce the gap between the hanger rod 200 and the fourth through hole 610. At the same time, upon the elastic ring 620 being in contact with the hanger rod 200, the elastic ring 620 is deformed, so as to be fitted more closely with the hanger rod 200 and further improve a sealing effect. Moreover, the elastic ring 620 can be deformed after being stressed, so as to achieve a buffering, and prevent the components of the fan lamp from making loud noises and short service life because of rigid collisions.

In an optional example, the fan lamp further includes a positioning piece 700, the light source assembly 400 includes a chassis 410, a light source board 420, and a light-transmitting cover 430, the chassis 410 is connected with the light-transmitting cover 430 to form a first optical chamber. The light source board 420 is mounted in the first optical chamber, and a plurality of light-emitting modules 440 are disposed on the light source board 420 at intervals. The light-emitting modules 440 include a light-emitting unit and a light distribution element, and the light distribution element covers the light-emitting unit and is located outside the light-emitting unit. The second end of the drive motor 330 extends into the first optical chamber, the positioning piece 700 is mounted on the second end of the drive motor 330 and located in the first optical chamber, and the positioning piece 700 is positioned and fitted with the chassis 410. In this example, the connection between the drive motor 330 and the light source assembly 400 can be realized through the positioning piece 700. This connection manner has a simpler structure and can simplify a connection operation of the drive motor 330 and the light source assembly 400.

Optionally, the above-mentioned positioning piece 700 can be a nut, and the positioning piece 700 can be screwed with the second end of the drive motor 330, so as to further simplify the connection operation of the drive motor 330 and the light source assembly 400.

Optionally, in the case where the driver 500 is mounted in the light source assembly 400, the driver 500 may be mounted in the above-mentioned first optical chamber. The space of the first optical chamber here is large, so it is more convenient to dispose the driver 500. Meanwhile, if the driver 500 needs to be disassembled, the driver 500 can be seen directly only by opening the light-transmitting cover 430, so this structure is more convenient to maintain the driver 500.

The above-mentioned driver 500 and light source board 420 are both located in the first optical chamber, and both are disposed close to the chassis 410, so they are prone to interference in structure. In one example, the driver 500 can be stacked on the light source board 420, but this structure will cause a part of the light source board 420 that is blocked by the driver 500 to fail to work, thereby causing waste in structure, and at the same time, it will also lead to a larger space occupied by the light source board 420 and the driver 500 together. Based on this, in another example, the light source board 420 is an annular board with an inner hole, and at least a part of the driver 500 is located in the inner hole. In this example, the light source board 420 can avoid the driver 500, so that all the structures of the light source board 420 can be used, and the driver 500 can be mounted in the space occupied by the light source board 420, thereby making the structure of the fan lamp more compact.

The retractable blade 320 of the blade assembly 300 can be expanded or retracted. In the case where the retractable blade 320 is in a retracted state, the retractable blade 320 does not work, and the space occupied by the blade assembly 300 will affect the aesthetics of the entire fan lamp. Based on this, the direction parallel with the hanger rod 200 is defined as a first direction. In the case where the retractable blade 320 is in the retracted state, an orthographic projection of the retractable blade 320 along the first direction is located within an orthographic projection of the chassis 410 along the first direction. That is, in the retracted state, an edge of the retractable blade 320 does not exceed the edge of the chassis 410, so that the space occupied by the retractable blade 320 in this state is as small as possible, thereby optimizing a structural compactness of the fan lamp.

In an optional example, the light source assembly 400 further include a mounting plate 450, the mounting plate 450 is disposed between the blade assembly 300 and the chassis 410, the second end of the drive motor 330 passes through the mounting plate 450, and the mounting plate 450 abuts against the chassis 410. Because the blade assembly 300 rotates during operation, while the light source assembly 400 is fixed, the blade assembly 300 and the light source assembly 400 can be better separated by the mounting plate 450. Meanwhile, the blade assembly 300 can be prevented from driving the light source assembly 400 to rotate, so as to achieve a purpose of improving a reliability of the fan lamp during operation. In addition, the mounting plate 450 abuts against the chassis 410, which can better limit a shaking of the chassis 410, prevent the chassis 410 from swing slightly due to a movement of the blade assembly 300, thereby improving the users experience when using the fan lamp.

In order to improve an appearance quality of the fan lamp, the light source assembly 400 further includes a decorative ring 460, and the decorative ring 460 is disposed on an outer peripheral surface of the light-transmitting cover 430. The material, shape and other structural parameters of the decorative ring 460 can be designed according to users' preference, thereby improving the appearance quality of the entire fan lamp.

As mentioned above, the number of the retractable blades 320 may be at least two. When the base plate 310 rotates, each retractable blade 320 is expanded under the action of centrifugal force. However, because of an influence of factors such as processing errors and assembly errors, an expansion range and a expansion speed of each retractable blade 320 may be different, which leads to a great chance of the heat dissipation effect of the blade assembly 300. Based on this, in an optional example, the blade assembly 300 further includes a synchronizing element 340 and a mounting seat 350. The synchronizing element 340 is rotatably mounted on the base plate 310, and a rotation center of the synchronizing element 340 coincides with a rotation center of the base plate 310. A plurality of retractable blades 320 are rotatably mounted on the base plate 310 through a plurality of mounting seats 350, the synchronizing element 340 is provided with a plurality of sliding grooves 341, the mounting seat 350 is provided with a protruding portion, and the protruding portions of mounting seats 350 are slidably fitted with the sliding grooves 341 in a one-to-one correspondence. When the base plate 310 rotates, the synchronizing element 340 rotates along with the base plate 310. Under the action of the plurality of sliding grooves 341 and the plurality of protruding portions, the retractable blades 320 can be expanded synchronously, thereby overcoming the influence of factors such as processing errors and assembly errors, so that the heat dissipation effect of the blade assembly 300 can more reliably approach a design value, thereby improving the blowing effect. Moreover, this structure can also promote the force of the fan lamp to be distributed more evenly, and prevent the fan lamp from shaking because of uneven distribution of the force.

In order to retract the retractable blade 320 more reliably, the blade assembly 300 may further include a torsion spring 360. One end of the torsion spring 360 is connected with the base plate 310, and another end of the torsion spring 360 is connected with the retractable blade 320. Specifically, the torsion spring 360 may be disposed on the mounting seat 350. When the retractable blade 320 is expanded, the torsion spring 360 is deformed by the force from the retractable blade 320. When the blade assembly 300 finishes working, the centrifugal force it receives disappears, and the force of the retractable blade 320 acting on the torsion spring 360 also disappears, and the torsion spring 360 can recover from being deformed, thereby exerting a reaction force on the retractable blade 320, so that the retractable blade 320 retracts with respect to the base plate 310 until the retractable blade 320 retracts into an original position. Because the space occupied by the torsion spring 360 is small, it is more favorable to realize a compact design of the fan lamp.

Optionally, the driver 500 includes a circuit board, which is provided with an input end, a first output end, and a second output end. The first output end is electrically connected with the drive motor 330, and the second output end is electrically connected with the light source assembly 400. The circuit board here can realize the control of the fan lamp, that is to say, the driving portion and the control portion of the fan lamp can be designed in an integral manner, so that the structure of the fan lamp is more compact.

In other examples, as shown in FIG. 12 to FIG. 15, the light source assembly 400 may include a chassis 410 and a directional lighting module 470, and the chassis 410 may provide a mounting basis for the directional lighting module 470, the blade assembly 300, or other components of the fan lamp, the directional lighting module 470 is disposed on the chassis 410. When being driven, the directional lighting module 470 can emit light, so that the fan lamp has the function of lighting. A lighting region of the directional lighting module 470 here is relatively concentrated, so that the region that needs accent lighting can be illuminated.

In the fan lamp disclosed in the example of the present disclosure, the light source assembly 400 includes the directional lighting module 470, which can perform directional lighting on accent region, and the users can control the working state of the directional lighting module 470 according to actual needs, so as to meet their own lighting needs. It can be seen that the fan lamp can perform directional lighting on accent region, so that the lighting effect of the fan lamp is better.

In an optional example, the directional lighting module 470 includes a first light source board 471 and at least one first light-emitting modules 472. The first light source board 471 is mounted on the chassis 410, and the first light-emitting module 472 is arranged on the first light source board 471. The first light-emitting module 472 includes a first light-emitting unit **472*a* and a first light distribution element 472*b*, and the first light distribution element 472*b* covers the first light-emitting unit 472*a* and is disposed outside the first light-emitting unit 472*a*. The first light-emitting unit 472*a* can emit light. Upon the light emitted from the first light-emitting unit 472*a* entering the first light distribution element 472*b*, the first light distribution element 472*b* can change a propagation direction of the light to realize light distribution, thereby adjusting the light emergent angle of the directional lighting module 470** to obtain the lighting effect desired by the user.

Optionally, the number of the first light-emitting modules 472 may be one or at least two. In the case where the number of the first light-emitting modules 472 is at least two, the first light-emitting modules 472 may be arranged at intervals, so that the emitted light is more uniform, thereby improving the lighting effect of the fan lamp.

Further, the first light distribution element **472*b* may be a lens, such as a convex lens or a concave lens, or may be a combination of a convex lens and a concave lens. The first light distribution element 472*b* can converge the light, so that the light is converged in a relatively small region, thereby improving the lighting effect of the directional lighting module 470**.

In order to avoid a glare problem when the directional lighting module 470 is lighting, in an optional example, the directional lighting module 470 further includes an anti-glare mask 473, and the anti-glare mask 473 is connected with the first light distribution element **472*b*. The anti-glare mask 473 here can further adjust a propagation direction of the light, so as to achieve the purpose of anti-glare, thereby improving the comfort of the users when using the fan lamp. For example, the light emitted from the first light-emitting unit 472*a* enters the first light distribution element 472*b*, and after the first light distribution element 472*b* redistributes the light, a part of the light within a light output range is irradiated into the lighting region of the directional lighting module 470, and another part of the light not within the light output range can be absorbed by the anti-glare mask 473. Therefore, in the case where the users are in a region outside the light output range, a brightness difference between the lighting region of the directional lighting module 470 and the region outside the lighting region is small, and human eyes will not be directly irradiated by a strong light of the first light-emitting unit 472*a*, thereby preventing the users from feeling dazzled and uncomfortable. Meanwhile, the connection of the anti-glare mask 473 and the first light distribution element 472*b* can further improve the aesthetics of the directional lighting module 470**.

Further, the anti-glare mask 473 may be a conical mask, and two ends of the anti-glare mask 473 are open ends. A taper of this conical mask can be controlled more accurately, therefore it is convenient to adjust structural parameters of the anti-glare mask 473, thereby helping to improve an anti-glare effect of the anti-glare mask 473. In addition, the conical mask is easier to process, which makes the anti-glare mask 473 easier to shape and lower in cost.

The optical parameters of the above-mentioned anti-glare mask 473 can be flexibly disposed. In order to improve the anti-glare effect of the anti-glare mask 473, a cone angle of the anti-glare mask 473 can be less than 37°. This arrangement can further narrow an irradiation range of light that is not within the light output range, thereby reducing an influence of glare on the users, and achieving the purpose of improving the anti-glare effect.

In an optional example, a color rendering index of the first light-emitting unit 472*a* is greater than or equal to 90. In the case where the color rendering index of the first light-emitting unit 472*a* is greater than or equal to 90, the light emitted from the first light-emitting unit 472*a* has a higher degree of color reproduction of an irradiated object. Under an irradiation of the light emitted from the first light-emitting unit 472*a*, the color of the object is closer to its real color, thereby improving the lighting effect of the directional lighting module 470.

Fan lamp can be used in various scenarios, such as lighting for a dining table region, a coffee table region, a sofa region, a bar region, and so on. In order to meet different usage requirements of the users, in an optional example, the light source assembly 400 further includes a floodlighting module 480, the floodlighting module 480 is mounted on the chassis 410, and the directional lighting module 470 and the floodlighting module 480 are both located on the same side of the chassis 410. The floodlighting module 480 here can irradiate a comparatively large region, so as to achieve an effect of floodlighting. The directional lighting module 470 and the floodlighting module 480 can be used separately or together. In the case where the users need to perform directional lighting on accent region, the directional lighting module 470 can be used; in the case where the user needs to perform an atmosphere lighting on a large region, the floodlighting module 480 can be used. It can be seen that in this example, both of the directional lighting module 470 and the floodlighting module 480 are provided, so that the fan lamp has at least two lighting modes, and the users can change the work state of the directional lighting module 470 and the floodlighting module 480 according to different usage requirements, so as to improve the lighting effect of the fan lamp.

Further, the light emergent angle of the directional lighting module 470 is smaller than the light emergent angle of the floodlighting module 480, so that the light-emitting range of the directional lighting module 470 is smaller than the light-emitting range of the floodlighting module 480, so the directional lighting module 470 can form a relatively small light-emitting range to achieve the directional lighting, while the floodlighting module 480 can form a relatively large lighting region to achieve floodlighting. It should be noted that the difference between the light emergent angle of the directional lighting module 470 and the light emergent angle of the floodlighting module 480 can be flexibly designed according to the usage requirements of the fan lamp, which is not limited in this example of the present disclosure.

In an optional example, the floodlighting module 480 includes a second light source board 481, a light diffusing mask 483, and at least one second light-emitting module 482. The light diffusing mask 483 is connected with the chassis 410 to form a second optical chamber. The second light source board 481 is mounted in the second optical chamber, and the second light-emitting module 482 is disposed on the second light source board 481. The second light-emitting module 482 includes a second light-emitting unit and a second light distribution element. The second light distribution element covers the second light-emitting unit and is disposed outside the second light-emitting unit. The second light-emitting unit can emit light, and the light emitted from the second light-emitting unit enters the second light distribution element, the second light distribution element scatters the light, thereby improving a uniformity of the floodlighting module 480 during lighting. Further, after the light emitted from the second light-emitting unit enters the second light distribution element and then is redistributed, the light enters the light diffusing mask 483, and the light diffusing mask 483 can further improve a divergence of the light, thereby improving the uniformity of the floodlighting module 480 during lighting, so as to improve the lighting effect of the floodlighting module 480.

In an optional example, the first light source board 471 and the second light source board 481 are both straight strip-shaped boards, and an extension direction of the first light source board 471 is parallel with an extension direction of the second light source board 481. Alternatively, the first light source board 471 and the second light source board 481 are both arc-shaped boards, and a center of the circle where the first light source board 471 is located coincides with a center of the circle where the second light source board 481 is located. With these two structures, whether the directional lighting module 470 and the floodlighting module 480 work separately, or the directional lighting module 470 and the floodlighting module 480 work simultaneously, a more regular lighting region can be generated. Meanwhile, the shape of the lighting region of the directional lighting module 470 is basically the same as the shape of the lighting region of the floodlighting module 480, so that the brightness of an overall lighting region of the fan lamp changes regularly, which can bring better visual feeling to the users. In addition, in the case where the first light source board 471 and the second light source board 481 are both straight strip-shaped boards or arc-shaped boards, the fan lamp is more compact in structure, simpler in processing, and lower in cost.

In an optional example, the number of the floodlighting modules 480 is at least two, and at least one directional lighting module 470 is disposed between adjacent floodlighting modules 480. In the case where at least one directional lighting module 470 is disposed between the adjacent floodlighting modules 480, the lighting region of the directional lighting module 470 is surrounded by the lighting region of the floodlighting module 480, and the lighting region of the directional lighting module 470 is located in a middle of the lighting region of the floodlighting module 480, so that the lighting region of the fan lamp is symmetrical, thereby improving the lighting effect of the fan lamp.

In other examples, the light source assembly 400 further includes a face frame 490, the face frame 490 is connected with the chassis 410, the face frame 490 is provided with a first receiving hole 491 and a second receiving hole 492, and the floodlighting module 480 is at least partially located in the first receiving hole 491, and the directional lighting module 470 is at least partially located in the second receiving hole 492. By adopting this structure, the face frame 490 can appropriately separate and block the directional lighting module 470 from the floodlighting module 480, so that the lighting region of the floodlighting module 480 and the lighting region of the directional lighting module 470 do not interfere with each other, which facilitates a division of the accent lighting region and the atmosphere lighting region by the fan lamp, thereby improving the lighting effect of the fan lamp. In addition, the floodlighting module 480 is at least partially located in the first receiving hole 491, and the directional lighting module 470 is at least partially located in the second receiving hole 492, which can prevent dust from entering the floodlighting module 480 and the directional lighting module 470, which is beneficial to a more stable operation of the floodlighting module 480 and the directional lighting module 470.

Further, at least two second receiving holes 492 are disposed between adjacent first receiving holes 491, and at least two directional lighting modules 470 are mounted in at least two second receiving holes 492 in the one-to-one correspondence. In this example, directional lighting modules 470 are mounted in different second receiving holes 492, so that the lighting regions of the directional lighting modules 470 are less prone to interfere with each other, which is beneficial for the directional lighting module 470 to perform directional lighting on accent region. Meanwhile, in the case where a size of the directional lighting region is fixed, by mounting at least two directional lighting modules 470 in the at least two second receiving holes 492, the size of a single second receiving hole 492 can be appropriately reduced, thereby ensuring the structural strength of the face frame 490.

In an optional example, the fan lamp further includes a controller, which is electrically connected with the directional lighting module 470 and the floodlighting module 480, respectively, and the controller is used to control the working states of the directional lighting module 470 and the floodlighting module 480. In the case where the controller controls one of the directional lighting module 470 and the floodlighting module 480 to work, the fan lamp can separately achieve accent lighting or atmosphere lighting for the space. In the case where the controller controls the directional lighting module 470 and the floodlighting module 480 to work together, the fan lamp can simultaneously achieve accent lighting and atmosphere lighting for the space. The working states of the directional lighting module 470 and the floodlighting module 480 are controlled by the controller, so as to improve the lighting effect of the fan lamp. Further, the fan lamp can be configured with a remote controller, which can perform wireless data transmission with the controller, and the users can connect the controller through the remote controller to control the working states of the directional lighting module 470 and the floodlighting module 480.

The above-mentioned controller may only be used to control the working states of the directional lighting module 470 and the floodlighting module 480, and may further be used to control the states of the blade assembly 300. Referring to the foregoing, the controller can be integrated on the circuit board, thereby further improving the structural compactness of the fan lamp.

The present disclosure discloses a fan lamp, which can solve the problem of poor lighting effect of the fan lamp.

In order to solve the above-mentioned problems, the present disclosure adopts the following technical solutions.

A fan lamp includes a ceiling suction assembly, a hanger rod, a blade assembly, a light source assembly, and a driver, the ceiling suction assembly is connected with the blade assembly through the hanger rod, the light source assembly is connected with the blade assembly, and the light source assembly is located on a side of the blade assembly facing away from the ceiling suction assembly, the driver is mounted in the ceiling suction assembly or the light source assembly, and the driver is electrically connected with at least one of the blade assembly and the light source assembly.

The light source assembly includes a chassis and a directional lighting module, and the directional lighting module is mounted on the chassis.

The technical solution adopted in this disclosure can achieve the following beneficial effects.

In the fan lamp disclosed in the example of the present disclosure, the light source assembly includes a directional lighting module, which can perform directional lighting on accent region, and the user can control the working state of the directional lighting module according to actual needs to meet their own lighting needs. It can be seen that the fan lamp can perform directional lighting on accent region, so that the lighting effect of the fan lamp is better.

The present disclosure may include dedicated hardware implementations such as disclosure specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an disclosure-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The above examples of this disclosure focus on the differences between the various examples. As long as the different optimization features between the various examples are not contradictory, they can be combined to form another example, without repeated here considering the conciseness of the text.

The above descriptions are only examples of this disclosure and are not used to be construed as any limitation to the present disclosure. For those skilled in the art, the present disclosure can have various modifications and changes. Any modification, equivalent replacement, improvement, etc. made within the spirit and principle of the present disclosure shall be included in the scope of the claims of the present disclosure.

What is claimed is:

1. A fan lamp, comprising:

a ceiling suction assembly, a hanger rod, a blade assembly, a light source assembly, and a driver, wherein the ceiling suction assembly is connected with the blade assembly through the hanger rod, the light source assembly is connected with the blade assembly, and the light source assembly is located on a side of the blade assembly facing away from the ceiling suction assembly, the driver is mounted in the ceiling suction assembly, the blade assembly, or the light source assembly, and the driver is electrically connected with at least one of the blade assembly and the light source assembly, and the light source assembly comprises a chassis, a directional light, and a floodlight, the directional light and the floodlight are both mounted on the chassis, and the directional light and the floodlight are both located on a same side of the chassis.

2. The fan lamp according to claim 1, wherein the directional light comprises a first light source board and at least one first light-emitter, the first light source board is mounted on the chassis, the first module light-emitter is disposed on the first light source board, and the first light-emitter comprises a first light-emitting unit and a first light distribution element, the first light distribution element covers the first light-emitting unit and is disposed outside the first light-emitting unit.

3. The fan lamp according to claim 2, wherein the directional light further comprises an anti-glare mask, and the anti-glare mask is connected with the first light distribution element.

4. The fan lamp according to claim 3, wherein the anti-glare mask is a conical mask, and two ends of the anti-glare mask are open ends.

5. The fan lamp according to claim 4, wherein a cone angle of the anti-glare mask is less than 37°.

6. The fan lamp according to claim 1, wherein:

a light emergent angle of the directional light is smaller than a light emergent angle of the floodlight; or the floodlight comprises a second light source board, a light diffusing mask, and at least one second light-emitter, and the light diffusing mask is connected with the chassis to form a second optical chamber, the second light source board is mounted in the second optical chamber, and the second light-emitter is disposed on the second light source board, the second light-emitter comprises a second light-emitting unit and a second light distribution element, the second light distribution element covers the second light-emitting unit and is disposed outside the second light-emitting unit.

7. The fan lamp according to claim 1, wherein a number of the floodlights is at least two, and at least one directional light is disposed between adjacent floodlights.

8. The fan lamp according to claim 1, wherein the light source assembly further comprises a face frame, the face frame is connected with the chassis, the face frame is provided with a first receiving hole and a second receiving hole, the floodlight is at least partially located in the first receiving hole, and the directional light is at least partially located in the second receiving hole.

9. The fan lamp according to claim 1, wherein:

the blade assembly comprises a base plate, a retractable blade, and a drive motor, and the retractable blade is rotatably mounted on the base plate, the drive motor is connected with the base plate, one end of the hanger rod is connected with the ceiling suction assembly, and the other end of the hanger rod is connected with a first end of the drive motor, the light source assembly is connected with a second end of the drive motor, and the light source assembly is located on a side of the blade assembly facing away from the ceiling suction assembly, and the driver is configured to be electrically connected with both of the drive motor and the light source assembly.

10. The fan lamp according to claim 9, wherein:

the driver comprises a circuit board, the circuit board is provided with an input end, a first output end, and a second output end, and the first output end is electrically connected with the drive motor, the second output end is electrically connected with the light source assembly; and/or the ceiling suction assembly comprises a ceiling suction box , the ceiling suction box is provided with a mounting chamber, and the driver is mounted in the mounting chamber.

11. The fan lamp according to claim 9, wherein the drive motor comprises a casing, a stator, and a rotor, the two ends of the stator are connected with the hanger rod and the light source assembly, respectively, the rotor is connected with the casing, and the casing is connected with the base plate.

12. The fan lamp according to claim 9, wherein:

the fan lamp further comprises a positioning piece, and the light source assembly comprises the chassis, a light source board, and a light-transmitting cover, the chassis is connected with the light-transmitting cover to form a first optical chamber, and the light source board is mounted in the first optical chamber, and the second end of the drive motor extends into the first optical chamber, and the positioning piece is mounted on the second end of the drive motor and is located in the first optical chamber, the positioning piece is positioned and fitted with the chassis.

13. The fan lamp according to claim 12, wherein:

the driver is mounted in the first optical chamber; and/or a direction parallel with the hanger rod is a first direction, and in the case where the retractable blade is in a retracted state, an orthographic projection of the retractable blade along the first direction is located within an orthographic projection of the chassis along the first direction.

14. The fan lamp according to claim 9, wherein:

the blade assembly further comprises a synchronizing element and a mounting seat, the synchronizing element is rotatably mounted on the base plate, and a rotation center of the synchronization member coincides with a rotation center of the base plate, and a plurality of retractable blades are rotatably mounted on the base plate through a plurality of mounting seats, the synchronizing element is provided with a plurality of sliding grooves, the mounting seat is provided with a plurality of protruding portions, and the plurality of protruding portions of the mounting seat are slidably fitted with the plurality of sliding grooves in a one-to-one correspondence; and/or the blade assembly further comprises a torsion spring, one end of the torsion spring is connected with the base plate, and the other end of the torsion spring is connected with the retractable blade.

* * * * *